Dec. 1, 1953  L. D. SHAND  2,661,438
COMPOSITIONS AND METHODS OF COATING
GLASS AND COATED GLASS ARTICLES
Filed July 20, 1949
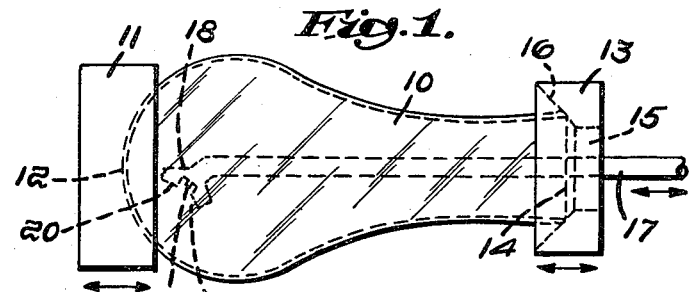
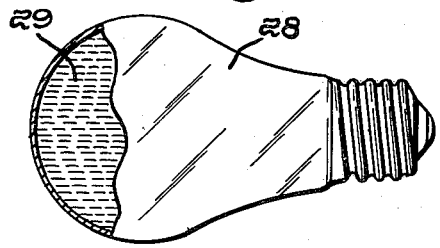
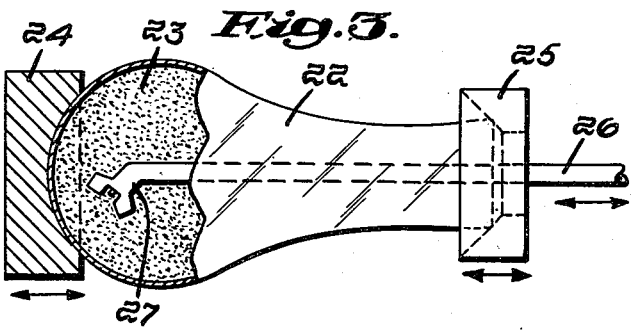
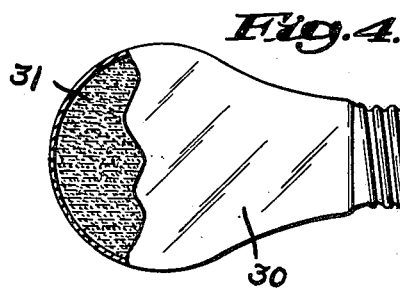
Inventor:
Lloyd D. Shand,
by Kerr E. Follers
Attorney Patented Dec. 1, 1953

2,661,438

UNITED STATES PATENT OFFICE 2,661,438

COMPOSITIONS AND METHODS OF COATING GLASS AND COATED GLASS ARTICLES

Lloyd D. Shand, Stoneham, Mass., assignor to Monsanto Chemical Company, St. Louis, Mo., a corporation of Delaware Application July 20, 1949, Serial No. 105,708

12 Claims. (Cl. 313—116)

The present invention relates to potentially light-diffusing compositions for coating glass, and particularly for coating incandescent lamp glass envelopes. This invention also relates to methods for imparting light-diffusing properties to clear glass and for improving the light-diffusing properties of etched or frosted glass, and particularly clear or frosted incandescent lamp glass envelopes. This invention also relates to glass articles, and more particularly to incandescent lamp bulbs, which have unique light-diffusing and light-transmitting properties.

It has been the practice heretofore to etch the surface of glass by chemical agents, for example, hydrofluoric acid to give the glass a frosted appearance and thus materially reduce its normal transparency and impart light-diffusing properties thereto. In the case of incandescent lamp bulbs this has been accomplished by first forming a glass envelope and then etching the inner surface thereof with hydrofluoric acid, after which the bulb is formed, in the customary manner, by assembling the etched envelope, lamp filament and the base portion. This etching process enables the preparation of what is commonly known as the "inside frosted incandescent lamp bulb" or, in brief, the "inside frosted bulb." A suitable method for the preparation of such bulbs is illustrated in the patent to Pipkin, No. 1,687,510, issued October 16, 1928. The unlighted lamps or bulbs have a characteristic grayish or silver appearance. When lighted, that is, when electricity is flowing through the filament of the bulb in the normal way, the bulbs or lamps give off a diffused light as compared with lighted clear bulbs or lamps. The light diffusing properties of an inside frosted bulb leave much to be desired, however, when it is considered that it is possible to distinguish the light in the immediate vicinity of the glowing filaments in the bulb from the light given off from other parts of the bulb, since the former light is much more intense. Thus that portion of the lighted bulb in the immediate vicinity of the filaments glows more brightly than other parts of the bulb, resulting in a harsh, glaring light.

It is highly desirable in many instances to produce incandescent bulbs or lamps, and other glass articles, which transmit light in the form of diffused light with more uniformity and with substantially the same efficiency as that normally possible in commercial practice by the use of bulbs or glass articles which have been prepared by etching processes per se, or with the same efficiency as that normally possible by the use of bulbs or glass articles which have been prepared by processes wherein the glass surface is physically roughened by mechanical means. In accordance with the present invention it is possible to produce glass articles, and particularly incandescent lamp bulbs, which not only transmit light efficiently, but which also diffuse the transmitted light to a greater extent than is normally possible or desirable in the case of glass articles which are only chemically etched or mechanically roughened. These improved glass articles are prepared in accordance with the present invention by a method wherein a coating is applied to the glass surface.

It is one object of the present invention to provide glass articles such as incandescent lamp bulbs which are coated with a light-diffusing and light-transmitting substance having good adhesion to glass, and which have excellent light-diffusing properties without appreciable loss of light-transmitting efficiency.

It is a further object of this invention to provide incandescent lamp bulbs having excellent light-diffusing properties and light-transmitting efficiency, and a white appearance.

It is a still further object of this invention to provide novel compositions for coating glass which compositions dry on glass surfaces to form a coating having good adhesion to the glass and excellent light-transmitting and light-diffusing properties.

It is a still further object of this invention to provide methods for the manufacture of coated glass articles and/or incandescent lamp bulbs which have uniquie light-diffusing and light-transmitting properties.

Still further objects and advantages of this invention will be apparent from the following description when taken together with the accompanying drawing and the appended claims.

The potentially light-diffusing compositions of this invention comprise as essential ingredients a mixture of a major proportion of an alkaline-reacting aqueous solution of colloidal silica (otherwise known as an alkaline-reacting silica aquasol) and a minor proportion of a substantially white, finely divided, solid silica such as a silica aerogel or silica xerogel. Such compositions may also comprise small amounts of a wetting agent to facilitate the dispersing of the finely divided, solid silica and to assist the spreading of the composition as it strikes a glass surface. It is preferred, however, in the coating of incandescent lamp envelopes to use compositions which are substantially free of organic materials which depose into carbonaceous materials at the temperatures existing in the lighted bulbs since the bulbs tend to blacken and this results in an undesirable appearance, decreased lighting efficiency and decreased light diffusion. It is also possible in some instances, as will appear more fully hereinafter, to use pigments, preferably inorganic pigments, in the above compositions in order to prepare colored glass coatings.

The terms "alkaline-reacting aqueous solution of colloidal silica" or "alkaline-reacting silica aquasols" as used herein are intended to designate aqueous solutions of silica having a pH between 8.5 and 11.0, preferably between 9.5 and 10.5, and which are extremely stable at room temperature, that is, the particles of silica therein do not appreciably settle out or set up as a gelatinous mass after standing for periods of 8 to 15 months and longer. Such solutions of silica also exhibit the property of drying down on glass to form a coating which has good adhesion to the glass surface. A further characteristic of such solutions of silica is that they have a viscosity which is not substantially greater than the viscosity of water at the same temperature, even at concentrations as high as 30 to 35% by weight of silica. At concentrations above 35% by weight silica they become increasingly viscous, but still flow readily at concentrations as high as 45% by weight of silica. A further distinguishing feature of such solutions is that the silica is present therein in the form of discrete, generally spherical, ultramicroscopic particles having average particle diameters which normally lie within the range between 40 millimicrons and 200 millimicrons and sometimes as high as 800 millimicrons.

The amount of silica present in such aqueous solutions may vary considerably depending on the viscosity at which it is possible to spray the final composition and the number of coats which it is desired to apply to the glass surfaces. In general, silica sols of the type described and which contain from 15 to 45% silica by weight may be used in the compositions described herein. It is preferred, however, to use alkaline-reacting silica sols which contain from 25 to 40% by weight of silica, since such sols may be used with a sufficient amount of the finely divided solid silica to give a single coating which has satisfactory light-diffusing properties.

Alkaline-reacting silica aquasols having the characteristics described above may be prepared in a variety of ways. One suitable method of preparing such sols consists in treating a dilute solution of an alkali silicate with a cation-exchange material, as described in the patent to Paul C. Bird, No. 2,244,325, adjusting the resulting aquasol to the proper pH, as hereinbefore defined, and then concentrating the aquasol by evaporation of water. A preferred method for preparing such aquasols consists in first reacting a mineral acid such as sulfuric acid with a water-soluble silicate such as sodium silicate until an acid-reacting sol is obtained. The resulting sol soon sets up into a gel which is then broken up into lumps and washed with water to remove the electrolytes formed during the reaction between the acid and the silicate. The washed gel is covered with a weak aqueous solution of a substance capable of forming hydroxyl ions, for example, sodium hydroxide. After the gel has absorbed the hydroxyl ions, it is separated from the excess solution and is heated, while avoiding the evaporation of water, for example, in an autoclave until the major portion of the gel is converted to an aquasol. The aquasol is then separated from any unconverted gel as, for example, by centrifuging. This method is described in greater detail in the example, which appears hereinafter, and in the patent to John F. White, No. 2,375,738, granted May 8, 1945. The silica aquasols produced in accordance with this method when used together with finely divided solid silica, have presently been found to give the best results.

The term "substantially white, finely divided, solid silica" as used herein is intended to designate siliceous materials such as silica aerogels, silica xerogels or hydrogels, white or substantially white diatomaceous earth (also known as kieselguhr) and other white, finely divided, solid silica. The individual particles of such materials may, in themselves, be transparent to opaque, but should preferably be transparent or at least translucent. A mass of individual particles of such siliceous materials should have a white or substantially white appearance. A preferred siliceous material, of the type described, is finely divided silica aerogel.

Silica aerogels which are suitable for use in this invention may be prepared in various ways. Such aerogels are suitably prepared, for example, by first mixing an aqueous sodium silicate solution with a mineral acid such as sulfuric acid to produce a silica aquagel. The resulting aquagel is then washed with water to remove water-soluble reactants and salts. The water in the aquagel is then completely or at least partially replaced by washing the gel with a low boiling water-miscible organic liquid, preferably low boiling alcohols such as methanol, ethanol, etc., until a substantial amount of the water in the original aquagel has been displaced by the organic liquid. The resulting silica gel as, for example, a silica alcogel is then slowly heated in an autoclave or other pressure resistant vessel, meanwhile releasing small quantities of vapor as required to avoid excessive pressures, until the temperature of the gel is slightly above the critical temperature of the liquid in the gel. At this point the liquid is converted to a vapor which is slowly released so as to avoid destruction of the gel structure. The aerogel obtained in this manner has substantially the same volume as the initial silica aquagel and consists essentially of a cellular silica structure having a large amount of void space. A more detailed description of the preparation of such aerogels will be found in the patents to Samuel S. Kistler, Nos. 2,093,454 and 2,249,767. Such aerogels may also be prepared by a similar procedure by using the silica organo-aquasols described in the patent to Morris D. Marshall, No. 2,285,449 instead of the silica gels described in the above Kistler patents. Since such aerogels are ordinarily produced in lump form they must be pulverized or comminuted before use. This is suitably accomplished by subjecting the aerogel to the action of a pulverizing or comminuting apparatus such as a hammer mill, ball mill, air attrition mill or the like until particles of the desired particle size are obtained.

In general, the degree of subdivision of the above described solid silica materials may vary considerably and depends on a large number of factors. Materials which are divided so finely that they have average particle diameters of approximately 1 micron, and, in general, below 2 microns can be mixed with alkaline-reacting silica aquasols, of the type described, to prepare compositions which are relatively stable and do not require agitation during spraying, that is, the particles of solid silica in such compositions do not settle rapidly and may not settle out for periods of from 2 to 30 days. There are several distinctions, however, between silica aquasols and water suspensions of such finely divided, solid silica particles and silica aquasols. In general, the water suspensions of finely divided, solid silica have a considerably higher viscosity at the same silica solids concentration than the silica aquasols. For example, at 30% by weight silica solids the water suspensions of finely divided solid silica are extremely viscous and pasty, and have poor fluidity, whereas a silica aquasol containing 30% by weight of colloidal silica has a viscosity not substantially higher than water and has practically the same fluidity as water. Moreover, the water suspensions of finely divided, solid silica dry down on glass to form powdery coatings which have poor adhesion to glass, that is, they flake off readily, whereas the silica aquasols dry down on glass to form a coating having good adhesion to the glass surface.

Finely divided, solid silica materials having average particle diameters above 2 microns, for example, between 2 microns and 15 microns may also be used. However, since such materials settle rapidly when mixed with the silica aquasols it is usually necessary to stir the resulting mixture more or less constantly during the period that they are being applied to the glass surface. In those instances where it is desired to avoid the rapid settling characteristics of such relatively coarse materials or of even coarser materials, this may be accomplished by adding the materials to the silica aquasol and then grinding the mixture, for example, in a ball mill.

The quantity of silica aquasol and finely divided, solid silica used in preparing the potentially light-diffusing compositions of this invention may be varied considerably depending on the light-diffusing effects desired and the number of coats which it is desired to apply to obtain the desired effect. Thus, potentially light-diffusing compositions may be prepared comprising 1% by weight of the finely divided solid silica and about 99% by weight of a silica aquasol containing about 15% by weight of silica. Such compositions are capable of providing fairly good light diffusion, but are most satisfactory when a plurality of coatings is applied. Compositions comprising 1% by weight of the finely divided solid silica and 99% by weight of a silica aquasol containing about 40% by weight of silica may be used to give single coatings having good light-diffusing properties. On the other hand, compositions comprising about 10% by weight of the finely divided silica, and 90% by weight of a silica aquasol containing from 15 to 35% by weight of silica give single coatings having good to excellent light-diffusing and light-transmitting properties, good adhesion to glass and a strikingly white appearance. Such compositions dry to form a coating comprising a major proportion of dry colloidal silica and a minor proportion of dry, finely divided, solid silica.

Compositions which are particularly useful, and are preferred for coating incandescent lamp envelopes, are those comprising a mixture consisting of from 3 to 7% by weight of the finely divided, solid silica and from 97 to 93% by weight of an alkaline-reacting silica aquasol containing from about 19 to 35% by weight of colloidal silica. Using a mixture containing these percentages of solid silica and silica aquasol, the final composition should contain between about 25 and 35% by weight of total silica solids to obtain a composition having good spraying properties and which will form single, opaque coatings having good light-diffusing and light-transmitting properties. When such compositions are dried they form a coating comprising a mixture consisting of from about 72 to 92% by weight of dry colloidal silica and about 28 to 8% by weight of dry, finely divided, solid silica.

The methods of this invention are carried out, in general, by applying the above described compositions to a clear glass surface, or a chemically etched glass surface, or to a mechanically roughened glass surface and then drying the coating thus formed. As described below the application of the composition and drying may take place simultaneously. In the case of horizontal glass surfaces such compositions may be applied by brushing, spraying or by other applicating means to a glass surface which is at the ambient temperature and allowed to air dry, or the drying may be accelerated by heating or baking the coating. In the case of vertical or curved glass surfaces, the above method leads to uneven application, and it is preferred to form the coating by spraying the compositions in the form of fine droplets on a glass surface which has been previously heated to a temperature sufficiently high to cause instantaneous or substantially instantaneous evaporation of water from the droplets as they strike the heated glass surface. In general, glass surfaces may be heated to temperatures as low as 100° C. to obtain satisfactory results on spraying while the spraying of glass surfaces which have been previously heated to temperatures of 350 to 400° C. often gives superior results. It is apparent that other temperatures may be used to produce the desired effect, namely a substantially even coating on the glass surface. Of course, excessively high temperatures should be avoided since there is some danger that the glass may thus become distorted, or that cracking will occur when the finely sprayed droplets strike the glass surface.

The manner in which the methods of this invention may be carried out in the case of incandescent lamp envelopes, and the nature of the incandescent lamp bulbs produced in accordance with this invention may be more fully understood by referring to the accompanying drawing, in which, Figure 1 is a view of a clear glass incandescent lamp envelope, inside of which is shown a pipe and nozzle by means of which the potentially light-diffusing compositions of this invention are sprayed on the inner surface of the glass envelope, together with means for holding the envelope, Figure 2 is a view of a finished, internally coated, clear glass incandescent lamp bulb partially broken away to show the coating of light-diffusing and light-transmitting substance on the inner surface thereof, Figure 3 is a view of an inside frosted, incandescent lamp envelope which is partially broken away to show, in the interior thereof, the pipe and spray nozzle by means of which the potentially light-diffusing compositions of this invention are sprayed on the inner (frosted) surface of the glass envelope, together with means for holding the envelope, and Figure 4 is a view of a finished, internally coated, inside frosted incandescent lamp bulb which is partially broken away to show the coating of light-diffusing and light-transmitting substance on the inner (frosted) surface thereof.

Referring now to the drawing and especially Figure 1, 10 represents a clear glass incandescent lamp envelope which is held in a horizontal position by chuck 11 at the spherical end 12 of the envelope, and by chuck 13 at the open end 14 of the envelope. Chuck 11 is cylindrical and solid, and has a partially spherical hollow depression in one end thereof which is shaped to fit the spherical portion 12 of the envelope. Chuck 13 is also cylindrical and has a cylindrical central opening 15, which widens out at the end adjacent to the envelope in the form of a truncated cone defined by the beveled surface 16. In Figure 1 the wall surface 16 is illustrated as touching the end 14 of the envelope 10, thus supporting and holding that end of the envelope in a horizontal position. Chucks 11 and 13 are moved outwardly and inwardly (by means not shown) as indicated by the direction arrows under each chuck so that the envelope may be released or supported as desired. These chucks are rotated at the same peripheral speed around the horizontal, longitudinal axis of the envelope as, for example, by driven individual contact rolls (not shown). Inserted in the interior of envelope 10, is a horizontal pipe 17 having a nozzle 18. Pipe 17 does not rotate, but its horizontal, longitudinal axis coincides with the horizontal, longitudinal axis of the envelope. Pipe 17 is supported, and moved in and out of the envelope 10, as indicated by the direction arrows, by suitable means (not shown). Spray nozzle 18 is mounted on pipe 17 at an oblique angle so that the spray issuing therefrom will move partially along the horizontal longitudinal axis of pipe 17 and partially transverse to such axis. Spray nozzle 18 is of the conventional type and consists of a central liquid aperture 19, and two compressed air apertures 20 and 21 from which compressed air streams diffuse the liquid issuing from aperture 19 thus generating a mist or spray of fine droplets. Compressed air is supplied to apertures 20 and 21 through channels in pipe 17 and by compressed air means (not shown). The potentially light-diffusing compositions of this invention are supplied to aperture 19 through pipe 17, using static pressure, by means of a suitable supply tank (not shown).

Referring now to Figure 3, the incandescent lamp envelope 22 having an etched inner surface 23 is held and supported in a horizontal position by chucks 24 and 25 (the former being shown in cross-section). Chuck 24 is of the same construction as chuck 11 of Figure 1 and chuck 25 is of the same construction as chuck 13 of Figure 1. Inserted in envelope 22, is pipe 26 having a spray nozzle 27. These are of the same construction as pipe 17 and spray nozzle 18 referred to in Figure 1.

The clear envelope 10 and the inside frosted envelope 22 are both coated in the same way as follows: the envelopes are first heated to the necessary temperature, as hereinbefore described, and are then clamped between the chucks, as illustrated in Figures 1 and 3. The pipe and spray nozzle are then inserted in the interior of the envelope close to the glass surface in the bottom thereof, after which each of the envelopes is caused to rotate rapidly about its horizontal, longitudinal axis by rapidly rotating the chucks, at both ends of the envelope, at the same peripheral velocity. The potentially light-diffusing composition and compressed air are supplied to the nozzle and a spray or mist, in the form of fine droplets, is thus generated. The resulting spray strikes a portion of the inner glass surface of the rotating envelope, and the heat of the glass causes the water in the composition to evaporate thereby forming a dry coating on that portion of the glass wall. The tube and nozzle are withdrawn from the envelope at a predetermined rate so that a substantially uniform coating of the desired thickness will be applied to the entire inner surface of the envelope.

In Figure 2 is shown a finished, incandescent electric lamp bulb 28 made of clear glass, and partially broken away to show the thin, light-diffusing and light-transmitting coating 29 which consists of a mixture of a major proportion of dry colloidal silica and a minor proportion of dry, finely divided, solid silica. The unlighted bulb has a white, opaque appearance, and can be handled quite roughly, as in packaging and shipping operations, without substantial flaking of the coating. The lighted bulb has reduced glare compared with a lighted inside frosted bulb per se without a sacrifice in light transmission. Moreover, the lighted bulb has a uniform brightness and the light given off is softer, easier to look at and to see by than a lighted inside frosted bulb of the same light output.

Figure 4 illustrates a finished incandescent electric lamp bulb 30 having an etched, inner glass surface, and which is partially broken away to show the light-diffusing coating 31 applied over the etched, inner surface of the glass, which coating consists of a mixture of a major proportion of dry colloidal silica and a minor proportion of dry finely divided, solid silica. The unlighted bulb has a white, opaque appearance, and can be handled roughly, as in packaging and shipping operations, without appreciable damage to the coating. The coating 31 does not reduce the light transmission to any substantial degree over and beyond the light-transmitting losses which characterize an inside frosted bulb per se. The lighted bulb has less glare, a more uniform brightness and the light given off is softer than in the case of a lighted inside frosted bulb of the same light output. Moreover, the lighted bulb glows uniformly whereas the lighted inside frosted bulb per se glows non-uniformly, in that, the portion of the bulb in the immediate vicinity of the filaments glows much more brightly than other portions of the bulb.

In accordance with the present invention it is also possible to produce colored light-diffusing coatings on glass surfaces, particularly on clear, etched or mechanically roughened glass surfaces, by incorporating a suitable amount of a finely divided organic pigment or finely divided mineral (inorganic) pigments in the composition before the composition is applied to a glass surface. In the case of lamp bulbs the pigment used should not decompose under the conditions of use to give off substances which injure the lamp filament and thus shorten the useful life of the bulb, nor should such pigments darken the coating under the conditions of use. Inorganic or mineral pigments are preferred for use in the compositions when they are employed for coating incandescent lamp envelopes and it is desired to obtain colored or tinted coatings. Since it is preferred, in the case of incandescent lamp bulbs, to obtain high light-transmitting efficiency and good light-diffusing properties, it is preferred to use only small amounts of such pigments, or amounts which are only sufficient to give the desired depth of color to the coating. As examples of mineral or inorganic pigments which may be used in such instances may be mentioned ferric oxide (Fe₂O₃), red lead (Pb₃O₄), chromic nitrate, chromic oxide, lead chromate (PbCrO₄) and mixtures of these substances with each other or with other materials such as silicates, and the like.

A further understanding of the present invention will be obtained from the following examples which are intended to be illustrative of the invention, but not limitative of the scope thereof, parts and percentages being by weight.

Example I

An alkaline-reacting silica aquasol was prepared as follows:

Seventy-three parts of 66° Bé. H₂SO₄ were diluted with 358 parts of water and charged to a mixing tank. Four hundred and seventy-two parts of an aqueous sodium silicate solution analyzing 8.9% Na₂O and 29% SiO₂ were diluted with 377 parts of water. The silicate solution was added with stirring to the acid solution. The resulting mixture set up as a gel a few minutes after the mixing was completed. After the gel had aged for 16 hours the syneresis liquor was drained off and the gel was crushed to one-inch lumps. The gel lumps were washed with a continuous flow of water for 16 hours and were then covered with 750 parts of water containing 0.9 part of NaOH. After standing for 6 hours the solution was drained off and a portion of the gel lumps were charged to an autoclave equipped with a steam jacket. The gel was then heated for 4 hours, using steam at 215 pounds per square inch (absolute pressure) in the jacket of the autoclave. The contents of the autoclave were then blown out and the residual undispersed gel was removed from the resulting sol by centrifuging. The sol thus produced contained about 12.5% SiO₂ and had a pH of about 9.5 (measured by a glass electrode). This aquasol was then concentrated rapidly, by heating, until it contained 30% SiO₂.

A composition suitable for coating glass in accordance with the present invention was prepared as follows:

Eighty-five parts of the above silica aquasol (containing 30% SiO₂), 10 parts of water and 5 parts of finely divided silica aerogel (75% having average particles less than 2 microns) were stirred together until the aerogel was thoroughly wetted out. The resulting mixture was then run through a homogenizer set at .005 inch clearance and was then run through the homogenizer set at 0.001 inch clearance. The resulting composition had a grayish cast. It had a viscosity which was satisfactory for spraying and the particles therein did not settle out during the period required for spraying.

An inside frosted (HF etched) glass envelope of the size used in preparing a conventional 100 watt electric incandescent lamp bulb was first heated to a temperature of 250° C. in a gas fired oven. The heated glass envelope was then removed from the oven and placed in holding chucks (as illustrated in Figure 3). and the chucks were then revolved rapidly at the same peripheral velocity by means of individually driven contact rolls. The above composition was then sprayed uniformly in the form of fine droplets on the inner (etched) surface of the revolving heated glass envelope using about 1.2 grams of the composition to coat the entire inner surface of the glass envelope. The water in the composition evaporated substantially instantaneously when the fine droplets struck the surface of the glass . The resulting glass envelope was thus coated with a substantially uniform coating consisting of 0.36 gram of silica deposit, of which 83.5% consisted of dry colloidal silica, and 16.5% consisted of dry, finely divided silica gel. The resulting coating was examined under the microscope using a magnification of 40X and 250X, and appeared to resemble the abrasive coating on sandpaper. A 100 watt incandescent lamp bulb containing 88% argon and 12% nitrogen was manufactured from the coated glass envelope in the normal way, and the finished unlighted bulb had a strikingly white appearance as contrasted to the grayish appearance of the inside frosted bulb per se. The lighted bulb gave a softer, more uniformly diffused light than a lighted uncoated inside frosted bulb of the same light output capacity, and without appreciable loss of light-transmitting efficiency. The lighted coated bulb glowed so uniformly that it was practically impossible to distinguish the light coming directly from the filaments in the bulb, from the light being emitted from other parts of the bulb. The bulb was tapped against a hard surface and the coating had sufficient adhesion to withstand this treatment without flaking off.

Example II

A clear glass envelope of the size used in preparing a conventional 100 watt electric incandescent lamp bulb was coated in the same manner, using the same composition as described in Example I, and was then fabricated into a 100 watt bulb. The resulting coated bulb (unlighted) had a slightly whiter appearance than the coated, inside frosted bulb of Example I, but the two bulbs were practically indistinguishable in all other respects, both in the lighted and unlighted comparisons. The adhesion of the coating to the inner surface of the glass bulb was satisfactory for normal use.

Various modifications and changes may be made in the compositions, methods and coated articles of this invention, as will be apparent to those skilled in the art, without departing from the spirit, of the invention. It is intended, therefore, that the scope of this invention be limited only by the scope of the appended claims.

What is claimed is:

1. A potentially light-diffusing composition for coating glass surfaces consisting essentially of a mixture of (1) from 93 to 97% by weight of an alkaline reacting silica aquasol containing from 19 to 35% by weight of colloidal silica particles having an average particle diameter within the range of 40 to 800 millimicrons and (2) from 7 to 3% by weight of substantially white, porous, amorphous solid silica particles having an average particle diameter between about 1 and 15 microns, said composition containing between 25 and 35% by weight of total silica solids.

2. A composition according to claim 1, but further characterized in that the colloidal silica particles have an average particle diameter within the range of 40 to 200 millimicrons.

3. A potentially light-diffusing composition for coating glass surfaces consisting essentially of a mixture of (1) from 93 to 97% by weight of an alkaline reacting silica aquasol containing from 19 to 35% by weight of colloidal silica particles having an average particle diameter within the range of 40 to 200 millimicrons and (2) from 7 to 3% by weight of substantially white, silica aerogel particles having an average particle diameter between about 1 and 15 microns, said composition containing between 25 and 35% by weight of total silica solids.

4. The method of producing light-diffusing glass articles which consists in first heating a glass article and then spraying the resulting heated glass article with fine droplets of a composition consisting essentially of (1) from 93 to 97% by weight of an alkaline reacting silica aquasol containing from 19 to 35% by weight of colloidal silica particles having an average particle diameter within the range of 40 to 800 millimicrons and (2) from 7 to 3% by weight of substantially white, porous, amorphous solid silica particles having an average particle diameter between about 1 and 15 microns, said composition containing between 25 and 35% by weight of total silica solids, said article being heated to a temperature sufficiently high to cause substantially instantaneous evaporation of water from said droplets as they strike the surface of said glass article, whereby a dry coating is formed on the glass surface.

5. The method of producing light-diffusing glass articles according to claim 4, but further characterized in that the colloidal silica particles have an average particle diameter within the range of 40 to 200 millimicrons.

6. The method of producing light-diffusing glass articles which consists in first heating a glass article and then spraying the resulting heated glass article with fine droplets of a composition consisting essentially of (1) from 93 to 97% by weight of an alkaline reacting silica aquasol containing from 19 to 35% by weight of colloidal silica particles having an average particle diameter within the range of 40 to 200 millimicrons and (2) from 7 to 3% by weight of substantially white, silica aerogel particles having an average particle diameter between about 1 and 15 microns, said composition containing between 25 and 35% by weight of total silica solids, said article being heated to a temperature sufficiently high to cause substantially instantaneous evaporation of water from said droplets as they strike the surface of said glass article, whereby a dry coating is formed on the glass surface.

7. The method of producing a light-diffusing glass incandescent lamp envelope which consists in first heating a glass incandescent lamp envelope to a temperature between about 100 and 400° C. and then spraying the inner surface of said envelope uniformly with fine droplets of a composition consisting essentially of a mixture of (1) from 93 to 97% by weight of an alkaline reacting silica aquasol containing from 19 to 35% by weight of colloidal silica particles having an average particle diameter within the range of 40 to 200 millimicrons and (2) from 7 to 3% by weight of substantially white, porous, amorphous solid silica particles having an average particle diameter between about 1 and 15 microns, said composition containing between 25 and 35% by weight of total silica solids, whereby a dry, light-transmitting and light-diffusing coating is formed on the glass surface.

8. The method according to claim 7, but further characterized in that the solid silica particles are silica aerogel particles having an average particle diameter between about 1 and 15 microns.

9. A glass article coated on one surface thereof with a light-transmitting and light-diffusing coating consisting essentially of a mixture of from 72 to 92% by weight of dry colloidal silica particles having an average particle diameter within the range of from 40 to 800 millimicrons, and from 28 to 8% by weight of dry, substantially white, porous, amorphous solid silica particles having an average particle diameter between about 1 and 15 microns.

10. A glass article according to claim 9, but further characterized in that the colloidal silica particles have an average particle diameter within the range of from 40 to 200 millimicrons, and the solid silica particles consist of dry, substantially white silica gel particles having an average particle diameter between about 1 to 15 microns.

11. An electric incandescent glass lamp bulb having on the entire interior surface of the light-transmitting portion thereof a light-diffusing and light-transmitting coating consisting essentially of a mixture of from 72 to 92% by weight of dry colloidal silica particles having an average particle diameter within the range of from 40 to 800 millimicrons, and from 28 to 8% by weight of dry, substantially white, porous, amorphous solid silica particles having an average particle diameter between about 1 and 15 microns.

12. An electric incandescent glass lamp bulb according to claim 11, but further characterized in that the colloidal silica particles have an average particle diameter within the range of from 40 to 200 millimicrons, and the solid silica particles consist of dry, substantially white silica gel particles having an average particle diameter between about 1 and 15 microns.

LLOYD D. SHAND.

References Cited in the file of this patent

UNITED STATES PATENTS

| Number | Name | Date |
| --- | --- | --- |
| 1,477,938 | Britton | Dec. 18, 1923 |
| 1,672,857 | Blake et al. | June 5, 1928 |
| 1,999,014 | Biggs et al. | Apr. 23, 1935 |
| 2,093,454 | Kistler | Sept. 21, 1937 |
| 2,238,472 | Koener et al. | Apr. 15, 1941 |
| 2,268,589 | Heany | Jan. 6, 1942 |
| 2,329,632 | Marsden | Sept. 14, 1943 |
| 2,375,738 | White | May 8, 1945 |
| 2,432,484 | Moulton | Dec. 9, 1947 |
| 2,442,976 | Heany | June 8, 1948 |
| 2,455,367 | King | Dec. 7, 1948 |
| 2,545,896 | Pipkin | Mar. 20, 1951 |